(12) United States Patent
Schedelbeck et al.

(10) Patent No.: US 8,788,901 B2
(45) Date of Patent: *Jul. 22, 2014

(54) RETRANSMISSION SCHEME FOR COMMUNICATION SYSTEMS

(75) Inventors: Gert Schedelbeck, Munich (DE); Dietmar Schoppmeier, Unterhaching (DE); Bernd Heise, Munich (DE); Umashankar Thyagarajan, Munich (DE)

(73) Assignee: Lantiq Deutschland GmbH, Neubiberg (DE)

(*) Notice: Subject to any disclaimer, the term of this patent is extended or adjusted under 35 U.S.C. 154(b) by 1302 days.

This patent is subject to a terminal disclaimer.

(21) Appl. No.: 12/244,037

(22) Filed: Oct. 2, 2008

(65) Prior Publication Data

US 2009/0089641 A1 Apr. 2, 2009

Related U.S. Application Data

(60) Provisional application No. 61/096,570, filed on Sep. 12, 2008, provisional application No. 61/096,636, filed on Sep. 12, 2008, provisional application No. 60/976,839, filed on Oct. 2, 2007, provisional application No. 60/984,132, filed on Oct. 31, 2007, provisional application No. 60/991,812, filed on Dec. 3, 2007, provisional application No. 60/976,808, filed on Oct. 2, 2007, provisional application No. 60/984,162, filed on Oct. 31, 2007, provisional application No. 60/991,809, filed on Dec. 3, 2007.

(51) Int. Cl.
*G08C 25/02* (2006.01)

(52) U.S. Cl.
USPC .......... 714/748; 714/749; 714/750; 714/751; 714/784

(58) Field of Classification Search
None
See application file for complete search history.

(56) References Cited

U.S. PATENT DOCUMENTS

| | | | |
|---|---|---|---|
| 5,477,550 A | 12/1995 | Crisler et al. | |
| 6,094,737 A | 7/2000 | Fukasawa | |

(Continued)

FOREIGN PATENT DOCUMENTS

| | | |
|---|---|---|
| CN | 1185690 A | 6/1998 |
| EP | 1077553 A1 | 2/2001 |
| EP | 1626519 A2 | 2/2006 |

OTHER PUBLICATIONS

Shin H.Y., et al.; "The Study of QoS Guarentee in the Optical Burst Switching Internet Backbone", Optical Switching and Networking, Elsevier, NL, vol. 3, No. 1, Jul. 1, 2006, p. 50-63.

(Continued)

*Primary Examiner* — Albert Decady
*Assistant Examiner* — Justin R Knapp (57) ABSTRACT

One embodiment relates to a method of communicating data between a transmitter and a receiver of a communication system. In this method, a payload data stream is received from a network interface layer. The payload data stream includes data units eligible for retransmission and data units non-eligible for retransmission. These data units are grouped into containers, where a container is associated with a container identifier that distinguishes the container from other containers. The containers are grouped into data transmission units, where a data transmission unit includes at least one container along with redundancy information that facilitates error detection for that data transmission unit. The data transmission units are transmitted to the receiver as a transmission data stream. Other methods and systems are also disclosed.

23 Claims, 9 Drawing Sheets

(56) References Cited

U.S. PATENT DOCUMENTS

| | | | |
|---|---|---|---|
| 6,141,784 A * | 10/2000 | Davis et al. | 714/748 |
| 7,924,710 B2 * | 4/2011 | Rollet | 370/230 |
| 8,468,427 B2 * | 6/2013 | Schedelbeck et al. | 714/776 |
| 2003/0002501 A1 * | 1/2003 | Reme | 370/389 |
| 2004/0243905 A1 * | 12/2004 | Merritt | 714/758 |
| 2005/0251721 A1 * | 11/2005 | Ramesh et al. | 714/748 |
| 2008/0062872 A1 * | 3/2008 | Christiaens et al. | 370/231 |
| 2008/0063007 A1 * | 3/2008 | Christiaens et al. | 370/458 |
| 2008/0244352 A1 * | 10/2008 | Kwon et al. | 714/748 |
| 2009/0067424 A1 * | 3/2009 | Zhang et al. | 370/389 |
| 2009/0077611 A1 * | 3/2009 | Singh et al. | 725/131 |
| 2009/0086759 A1 | 4/2009 | Heise et al. | |
| 2009/0086760 A1 * | 4/2009 | Vedantham et al. | 370/474 |
| 2009/0089638 A1 | 4/2009 | Heise et al. | |

OTHER PUBLICATIONS

G.inp: Performance of Retransmission Layer at the Gamma Interface; RJ-054, ITU-T Drafts; Study Period 2005-2008, International Telecommunication Union, Geneva; CH, vol. Study Group 15; 4/15, Apr. 8, 2007, p. 1-11.

Office Action dated May 21, 2012 for U.S. Appl. No. 12/543,916.

Notice of Allowance Dated Feb. 21, 2013 for U.S. Appl. No. 12/543,916.

* cited by examiner

| | | |
|---|---|---|
| FH (Fragment Header): | FSID | Fragment Sequence ID from fragmentation by modem or bonding layer (not necessarily contiguous) |
| | EF (End of Fragment) | $FF_H$ = Fragment size exceeds Container. Remaining fragment data is continued in next Container |
| | | $01H .. FE_H$ = Number of following bytes till end of Fragment |
| | | $00_H$ = Idle data till end of container |
| CH (Container Header): | CID | (Optional) Container Identification |
| | RTx | RTx Protection group (e.g. Eligible for RTx, high delay allowed low delay allowed) |

RETRANSMISSION SCHEME FOR COMMUNICATION SYSTEMS

REFERENCE TO RELATED APPLICATIONS

This application claims priority to U.S. Provisional Application No. 61/096,570 (entitled "Generic Retransmission Scheme for Communication Systems"), which was filed on Sep. 12, 2008.

This application also claims priority to U.S. Provisional Application No. 61/096,636 (entitled "Flexible Layer Retransmission Scheme Using Correlation Information at different Layers"), which was filed on Sep. 12, 2008.

This application also claims priority to U.S. Non-provisional application Ser. No. 12/209,212; U.S. Provisional Application No. 60/976,839, which was filed on Oct. 2, 2007; U.S. Provisional Application No. 60/984,132, which was filed on Oct. 31, 2007; and U.S. Provisional Application No. 60/991,812, which was filed on Dec. 3, 2007.

This application also claims priority to U.S. Non-provisional application Ser. No. 12/209,211; U.S. Provisional Application No. 60/976,808, which was filed on Oct. 2, 2007; U.S. Provisional Application No. 60/984,162, which was filed on Oct. 31, 2007; and U.S. Provisional Application No. 60/991,809, which was filed on Dec. 3, 2007.

The contents of all the above listed Provisional and Non-Provisional applications are herein incorporated by reference in their entirety.

FIELD OF DISCLOSURE

The present invention relates generally to communication systems and more particularly to Digital Subscriber Line (DSL) and wireless communication systems.

BACKGROUND

In today's business climate, industry fortunes rise and fall on whether information is exchanged in an efficient manner. For example, cell phones, pagers, and the Internet have thrived because each technology allows businesses to exchange information over a network. Therefore, to satisfy our society's need for efficient exchange of information, there is an on-going need for improvements in networks.

SUMMARY

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

One embodiment relates to a method of communicating data between a transmitter and a receiver of a communication system. In this method, a payload data stream is received from a network interface layer. The payload data stream includes data units eligible for retransmission and data units non-eligible for retransmission. These data units are grouped into containers, where a container is associated with a container identifier that distinguishes the container from other containers. The containers are grouped into data transmission units, where a data transmission unit includes at least one container along with redundancy information that facilitates error detection for that data transmission unit. The data transmission units are transmitted to the receiver as a transmission data stream. Other methods and systems are also disclosed.

The following description and annexed drawings set forth in detail certain illustrative aspects and implementations of the invention. These are indicative of only a few of the various ways in which the principles of the invention may be employed.

DETAILED DESCRIPTION

One or more implementations of the present invention are now described with reference to the attached drawings, wherein like reference numerals are used to refer to like elements throughout. Although examples of retransmission schemes are discussed below in the context of VDSL and ADSL systems, it should be noted that the invention in general is applicable to any communication system. Nothing in this detailed description is admitted as prior art.

Figure 1:
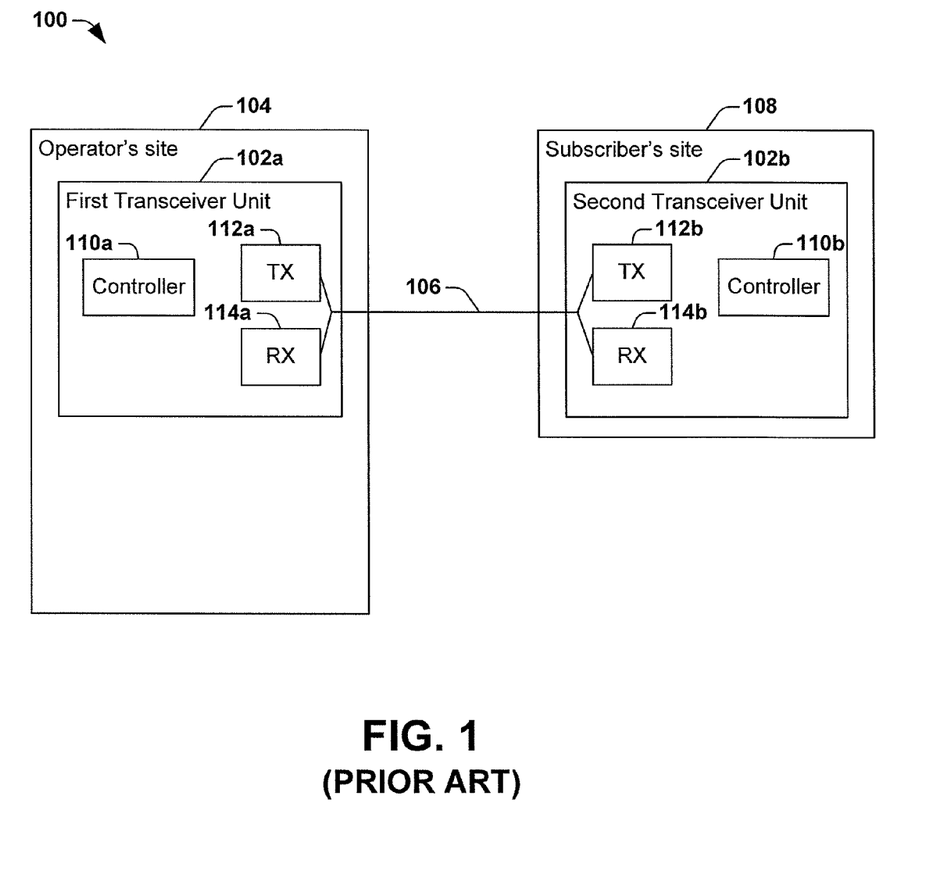
FIG. 1 is a schematic diagram of a DSL communication system according to an embodiment.

FIG. 1 shows an embodiment of a DSL communication system 100. As is known to a person skilled in the art, the DSL communication system 100 may be a DMT (discrete multitone) system wherein data is modulated on plurality of subcarriers such that each subcarrier is associated with one carrier frequency. The DSL communication system 100 comprises a first transceiver 102a provided at an operator's site 104, such as a central office (CO), a cabinet or other network termination unit. The first transceiver 102a is coupled to a second transceiver 102b via a subscriber line 106. The second transceiver 102b is integrated in a customer premises equipment (CPE) subscriber unit 108, such as a modem, router or any other gateway which may also be integrated in other devices such as a personal computer or notebook.

The first transceiver 102a includes a first transmitter 112a and a first receiver 114a coupled to the subscriber line 106. The second transceiver 102b includes a second transmitter 112b and a second receiver 114b coupled to the subscriber line 106. For coupling of the transmitters and receivers each of the transceivers may comprise a coupling interface such as hybrid networks etc.

A first controller 110a may be provided to control and coordinate functions for first transceiver 102a. Furthermore, a second controller 110b may be provided at the subscriber site to control and coordinate functions for first transceiver 102a. While FIG. 1 shows the first and second controllers 110a, 110b integrated with first and second transceivers 102a, 102b, respectively, it is to be understood that the first and second controllers 110a, 110b may be provided separate from the respective transceivers. It is further to be understood that components, such as the first and second controllers, may each comprise multiple components and may be implemented in hardware, software, firmware or any combinations thereof.

Furthermore, while FIG. 1 shows only one subscriber line to a remote subscriber, it is to be understood that the first transceiver 102a may be coupled to multiple subscriber units 108, each of which may have multiple second transceivers 102b thereat. Furthermore, in some embodiments, two or more subscriber lines may be bonded to provide higher data rate to a subscriber.

Figure 2:
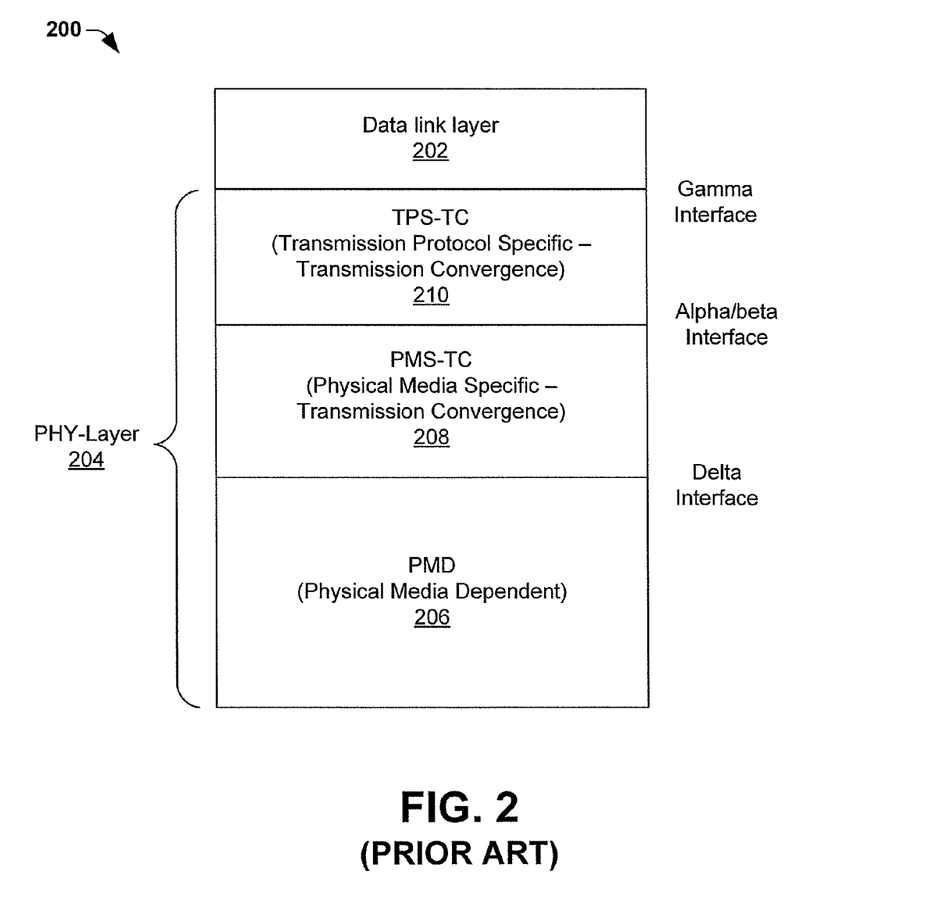
FIG. 2 is a schematic block diagram of a communication layer model.

For a better understanding of how the DSL communication system 100 exchanges data, some layers from an illustrative network protocol stack 200 of a VDSL or ADSL system are explained with respect to FIG. 2. FIG. 2 shows the lowest two layers in the OSI model, i.e. the data link layer 202 and the PHY layer 204. For purposes of clarity and simplicity, higher level levels in the OSI model are not shown. According to FIG. 2, the PHY layer 204 is divided into three PHY-sublayers.

The first PHY-sublayer is the PMD (physical media dependant) layer 206, which includes basic functionality such as symbol timing generation and recovery, encoding and decoding, modulation and demodulation, echo cancellation (if implemented) and line equalization, link startup, and physical layer 204 overhead (superframing). Additionally, the PMD layer 206 may generate or receive control messages via an overhead channel.

The next PHY-sublayer is the PMS-TC (physical media specific-transmission convergence) layer 208 which is connected to the PMD layer 206 through the δ interface (delta-interface). The PMS-TC layer 208 is a management plane and provides management primitive indications to management entities in the CO and CPE modems. The PMS-TC layer 208 also provides functionality such as generation of frames and synchronization of frames, (de)scrambling, Reed-Solomon coding and interleaving.

The third PHY-sublayer is the TPS-TC (transmission protocol specific-transmission convergence) layer 210 which is connected to the PMS-TC layer 208 through an α-interface (alpha-interface) at the Central Office Site or a β-interface (beta-interface) at the subscriber site. The TPS-TC layer 210 provides functionality such as packetizing into frames, organizing of the bearer channels, multiplexing. The TPS-TC layer 210 is connected to the data link layer 202 (layer two in the OSI model) by the γ-interface (gamma-interface).

As data is processed by the network protocol stack 200 and transmitted over the subscriber line 106, impulse noise and cross talk noise can adversely affect the transmitted data. This noise tends to corrupt the transmitted data, causing data to be lost and hindering efficient communication. In current xDSL systems like ADSL and VDSL there are several mechanisms like Trellis coding, RS coding and interleaving specified to mitigate the effects of this noise. However, with the increasing popularity of services such as video, (where lost information can cause "flicker" on the video screen), it is desirable to provide a higher level of service quality than achievable with current techniques.

Retransmission is one technique proposed in this application to increase the quality of video and other applications over DSL. In some embodiments, the retransmission functionality is inserted into the data link layer 202 or physical layer 204 of the network protocol stack 200. In previous solutions, retransmission functionality has been specific to the "Gamma-interface" or "Alpha-interface" (and, thus, retransmission functionality has not interchangeable between layers). By contrast, in some embodiments of the present invention, retransmission functionality is independent of particular network stack layers.

Figure 3:
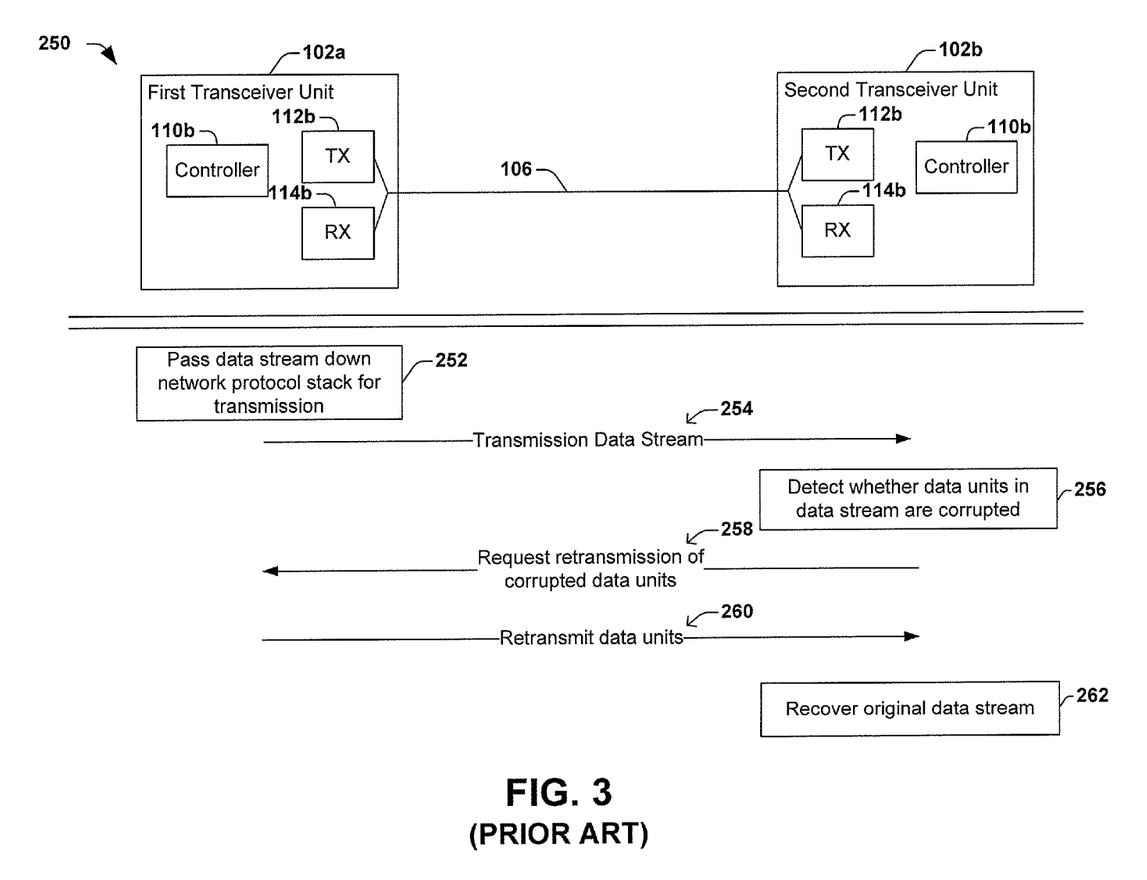
FIG. 3 is a retransmission protocol diagram according to an embodiment.

FIG. 3 shows a somewhat general retransmission protocol 250. As shown, a first transceiver 102a passes a data stream down the network protocol stack for transmission at 252. At 254, the first transmitter 112b transmits a transmission data stream to a second transceiver 102b over the subscriber line 106. Upon the second transceiver 102b receiving the transmitted data stream, the second controller 110b determines whether data units in the data stream are corrupted at 256. If corrupted data units are detected, the second transceiver 102b requests retransmission of the corrupted data units at 258. At 260, the first transceiver 102a responds to this retransmission request by retransmitting the requested data units, thereby allowing the second transceiver 102b to recover the original data stream at 262. It will be appreciated that in other embodiments the second transceiver 102b could act as the transmitter/retransmitter, and the first transceiver 102a could act as the receiver. Several more detailed embodiments are described below with reference to the remaining figures.

Figure 4A:
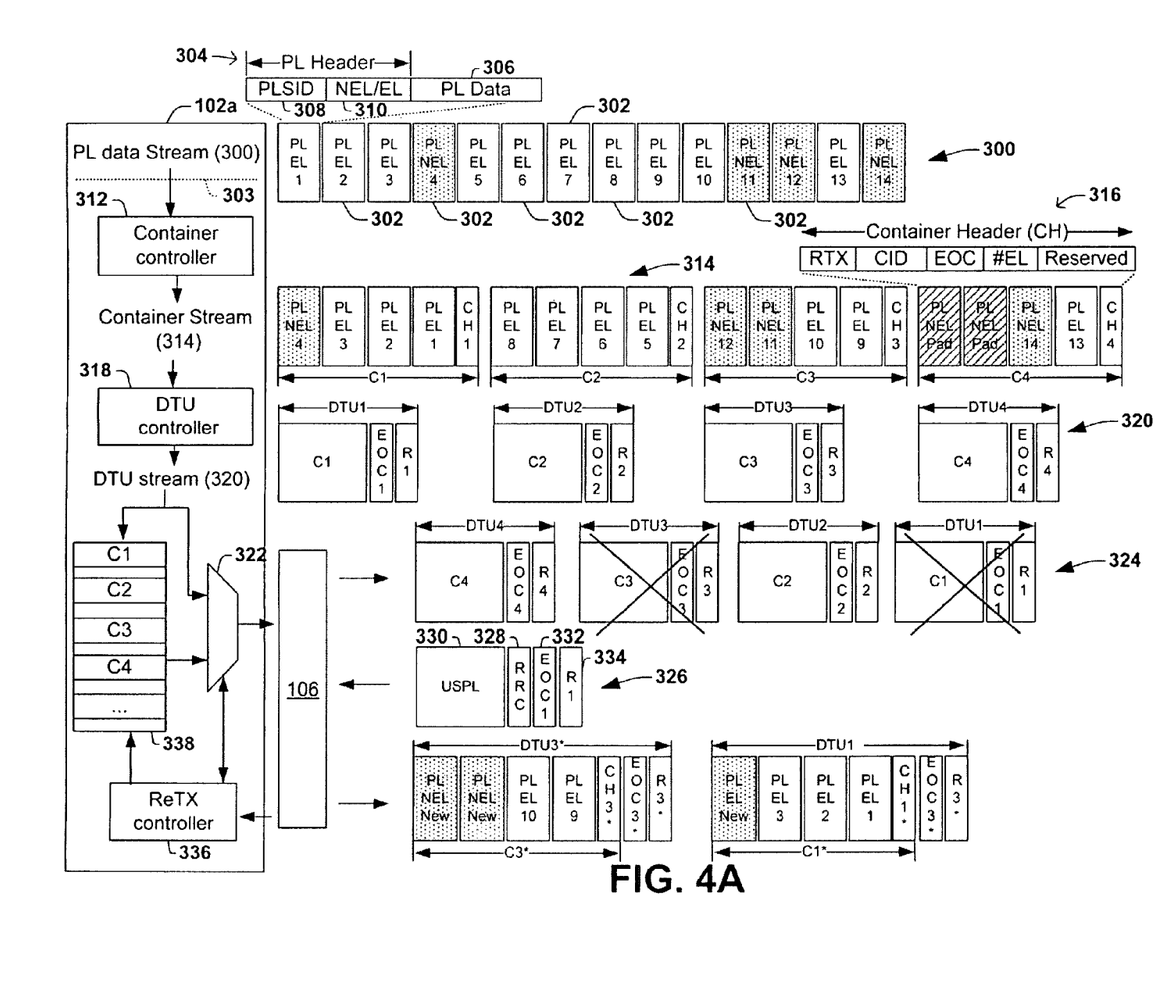
FIG. 4A is a retransmission protocol from the viewpoint of a transmitter according to an embodiment.
Figure 4B:
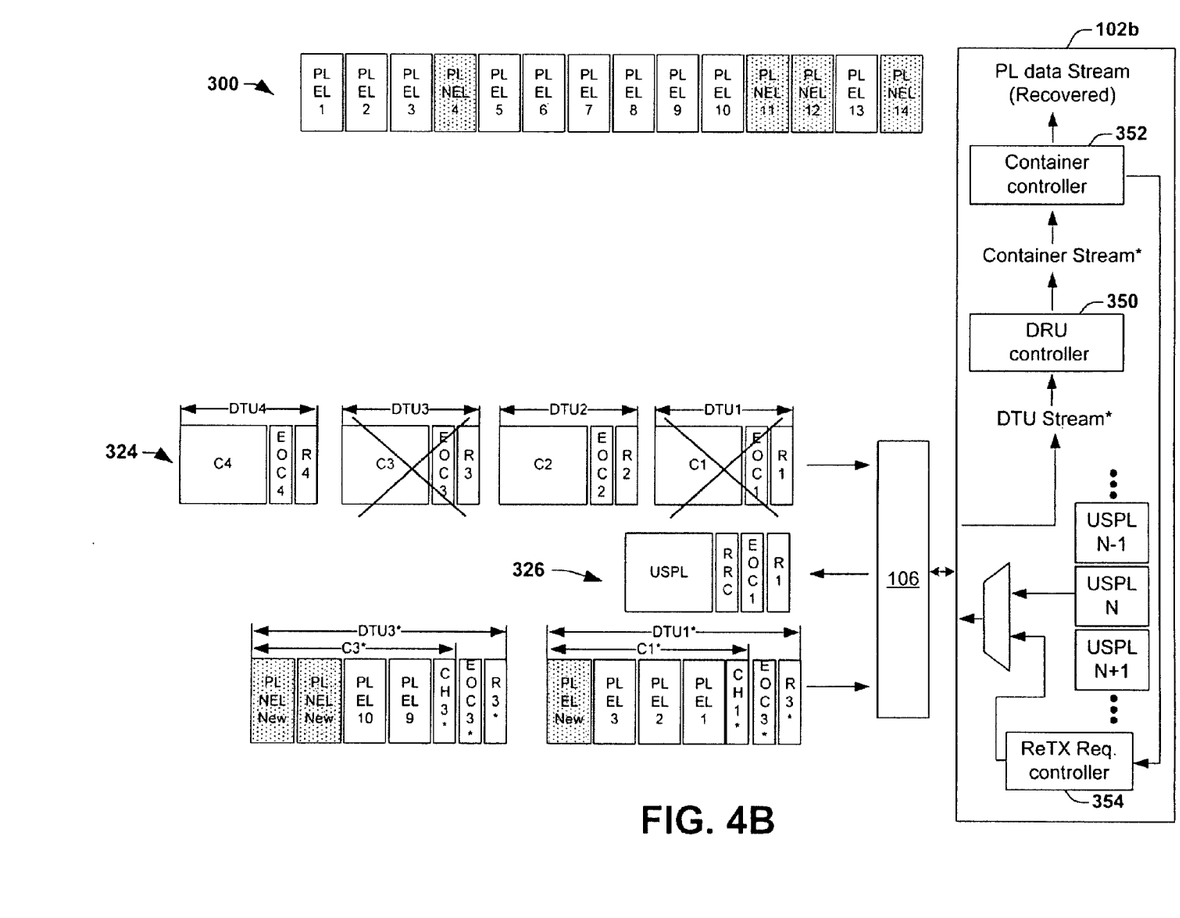
FIG. 4B is a retransmission protocol from the viewpoint of a receiver according to an embodiment.

Referring now to FIGS. 4A-4B, one can see a more detailed retransmission protocol. In particular, FIG. 4A shows the protocol from the point of view of a transmitter (e.g., first transceiver 102a) and FIG. 4B shows the protocol from the point of view of a receiver (e.g., second transceiver 102b). This embodiment is based on grouping several data units together into a container, and then associating a container identifier (CID) with the container as a reference for retransmission. Compared to prior art systems, this embodiment achieves a low overhead rate that results in more efficient communication.

On the transmitter-side, FIG. 4A shows a payload data stream 300 received at a network interface layer 303 (e.g., at the gamma interface). The payload data stream 300 includes a number of individual payload data units 302 (PL) labeled as either eligible for retransmission (EL) or non-eligible for retransmission (NEL). In some embodiments, each data unit 302 constitutes a single complete packet or cell from a higher level network protocol layer (e.g., Ethernet packet or Asynchronous Transfer Mode (ATM) cell).

Each data unit can be made up of a payload header 304 and payload data 306. The payload header 304 often includes a payload sequence identifier (PLSID) 308 and a retransmission identifier 310 (NEL/EL). The PLSID 308 specifies the position of the data unit relative to other data units in the payload data stream 300, thereby allowing the upper layer protocol at a receiver to re-assemble the payload data stream 300 in the proper order. The retransmission identifier 310 indicates whether the data unit is either eligible for retransmission (EL) or non-eligible for retransmission (NEL). For example, real-time voice data could be classified as NEL because retransmission would result in unacceptable latency (delay) between a conversation's participants. By contrast, video or FTP data could be classified as EL because it could be buffered without causing unacceptable latency.

After being received at the network interface layer 303, this payload data stream 300 is processed by a container controller 312, which may be positioned at the gamma interface. The container controller groups the payload data stream 300 into a container stream 314 made up of a series of containers (e.g., C1, C2, C3, C4). Each container includes a container header and a series of data units. For example, container4 (C4) includes container header (CH4) as well as four payload data units: payload-EL-13, payload-NEL-14, and two pad/dummy units. Although FIG. 3 shows an example where all the containers contain the same number of data units (i.e., four data units), in other embodiments different containers can include different numbers of data units, so long as the differing lengths are known to both transmitter and receiver.

The container header 316 can include several fields. For example, the illustrated fields include: (a) a first-transmission/retransmission field (RTX) that indicates whether the data in the container header is being transmitted for the first time or is being retransmitted, (b) a container identifier (CID) that uniquely identifies a given container, (c) an embedded overhead channel (EOC) byte; (d) an (#EL) field that indicates the number of EL data units in the container; and (e) a reserved field that can be include other useful information.

After a container is generated, a DTU controller (data transmission unit controller 318, which may be positioned at the alpha/beta interface) processes the container, thereby generating a DTU stream (data transmission unit stream 320). Each illustrated DTU (e.g., DTU1) includes a single container (e.g., C1), redundancy bits (e.g., R1), and an embedded overhead channel (EOC) byte (e.g., EOC1). In case of ATM, the redundancy bits are based on Reed-Solomon (RS)-check codes; while in case of Ethernet, the redundancy bits are based on cyclic redundancy checks (CRC). In other embodiments, each DTU could include multiple containers, and different DTUs could include different numbers of containers.

A transmission controller 322 forms a transmission data stream 324 that is transmitted over the subscriber line 106. This transmission data stream could include containers transmitted for their first time and retransmission containers. When the transmission data stream 324 is transmitted, noise (e.g., impulse noise) may corrupt the data in the DTUs, for example as indicated by the "X"s on DTU1 and DTU3.

If the receiver detects erroneous data, the receiver sends a retransmission request 326 back to the first transceiver 102a. The retransmission request 326 specifies the containers that were received with erroneous data. For example, in the illustrated embodiment, the RRC field 328 in the retransmission request 326 can specify the CIDs of corrupted containers received at the receiver. In some embodiments the RRC field 328 can be piggybacked with upstream payload data (USPL) 330 that is transmitted from the second transceiver 102b to the first transceiver 102a, along with an EOC field 332 and redundancy bits 334. In one embodiment, the retransmission request 326 includes a fixed number of bytes per symbol. In this case, the receiver can request the number of containers per symbol.

Upon receiving the retransmission request 326, a retransmission controller 336 retrieves the containers specified in the RRC field 328. To facilitate this functionality, the single copy of each DTU from the transmission data stream 324 (or at least the container associated with the DTU) is stored in a retransmission buffer 338. These DTUs can be stored in the retransmission buffer 338 for up to some expiration time after transmission or until the retransmission buffer 338 is full. In retrieving the containers to be retransmitted, the retransmission controller 336 can use a look-up table that correlates the CID(s) indicated in the retransmission request 326 with the container's address in the retransmission buffer 338.

After looking up the container to be retransmitted, the retransmission controller 336 then pulls only the payload EL data units from the original container (i.e., ignoring the payload NEL data), and then appends new data (e.g., previously untransmitted EL, NEL or pad data) to fill the remainder of the container to be retransmitted. Thus, in FIG. 4A's example, container1 (C1*) is retransmitted with original EL-data-unit-1, original EL-data-unit-2, and original EL-data-unit-3 along with a data unit of new data; while container3 is retransmitted with original EL-data-unit-9 and original EL-data-unit-10 along with two data units of new data. The container headers for these retransmitted containers include the CID of the original container and specify that the containers are retransmission containers. Redundancy bytes and EOC bytes are then appended to the containers, and the retransmission containers are inserted into the transmission data stream and transmitted over the subscriber line 106.

Referring now to FIG. 4B, one can see the receiver-side protocol. In this example the receiver receives from over the subscriber line 106 the DTU stream, which includes corrupted DTUs (DTU1, DTU3). The data reception unit (DRU) controller 350 then uses the redundancy bytes to detect whether errors are present in each DTU. If possible, the DRU controller 350 may use the redundancy bytes to correct these errors. Upon receiving the container stream, which now includes "holes" where the corrupted containers occurred, a container controller 352 notes which containers need to be retransmitted and sends a control signal to a retransmission request controller 354. For example, in FIG. 3, the control signal would specify that container1 and container3 are corrupted, and therefore should be retransmitted. The retransmission request controller 354 then sends a retransmission request 326 back to the first transceiver 102a indicating which containers need to be re-transmitted. In time, the receiver receives the retransmitted containers C1*, C3*, which may also include new data, and will recover the originally transmitted payload data stream 300.

One major problem with some existing retransmission schemes is that there is no protection for the embedded overhead channel (EOC) data. To remedy this shortcoming, in some embodiments the transmitter, upon receipt of a retransmission request, checks if the CID of the container is associated with EOC data. If there is EOC data associated with the container, then the EOC data is retransmitted to the receiver along with the payload EL data of the container.

Figure 5:
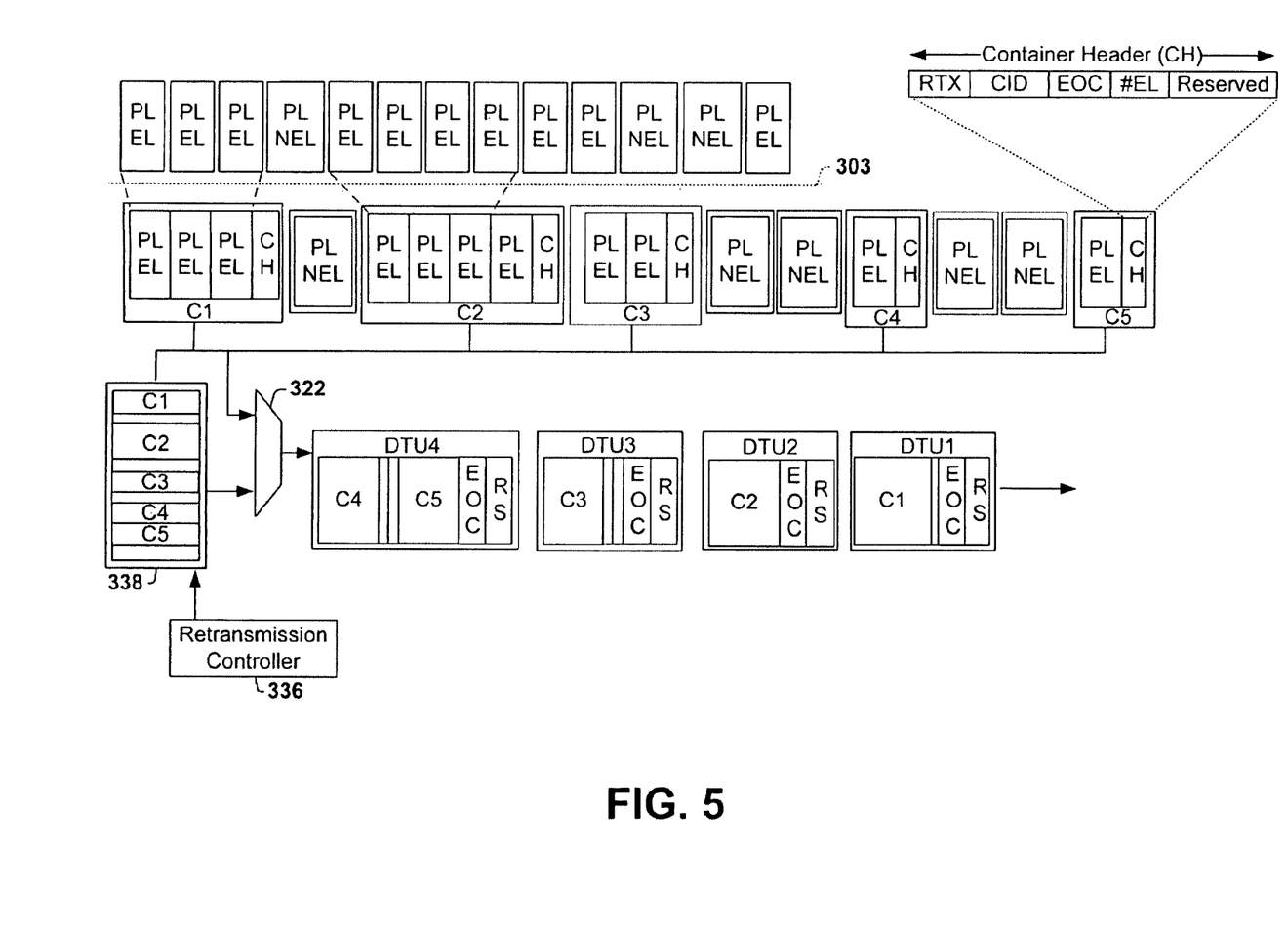
FIG. 5 is a retransmission protocol according to an embodiment.

FIG. 5 shows another embodiment of how the container controller 312 can group data units into containers. In this example, a container is packed with contiguous bytes of EL data up to a maximum container size, then labeled with a CID (which may reside in a container header). If NEL data is encountered before the maximum container size is reached, the container is "closed" and labeled with a CID directly after the last EL data. The NEL data is then packed into the next container. This packing technique allows a receiver to request retransmission of containers that include only EL data (i.e., the requested containers do not include NEL data). DTUs are then grouped to include the consecutive containers as shown, with redundancy and EOC information added. Therefore, for very long contiguous packets (e.g., video packets, which are a typical case), this embodiment realizes very low overhead for retransmission.

Figure 6:
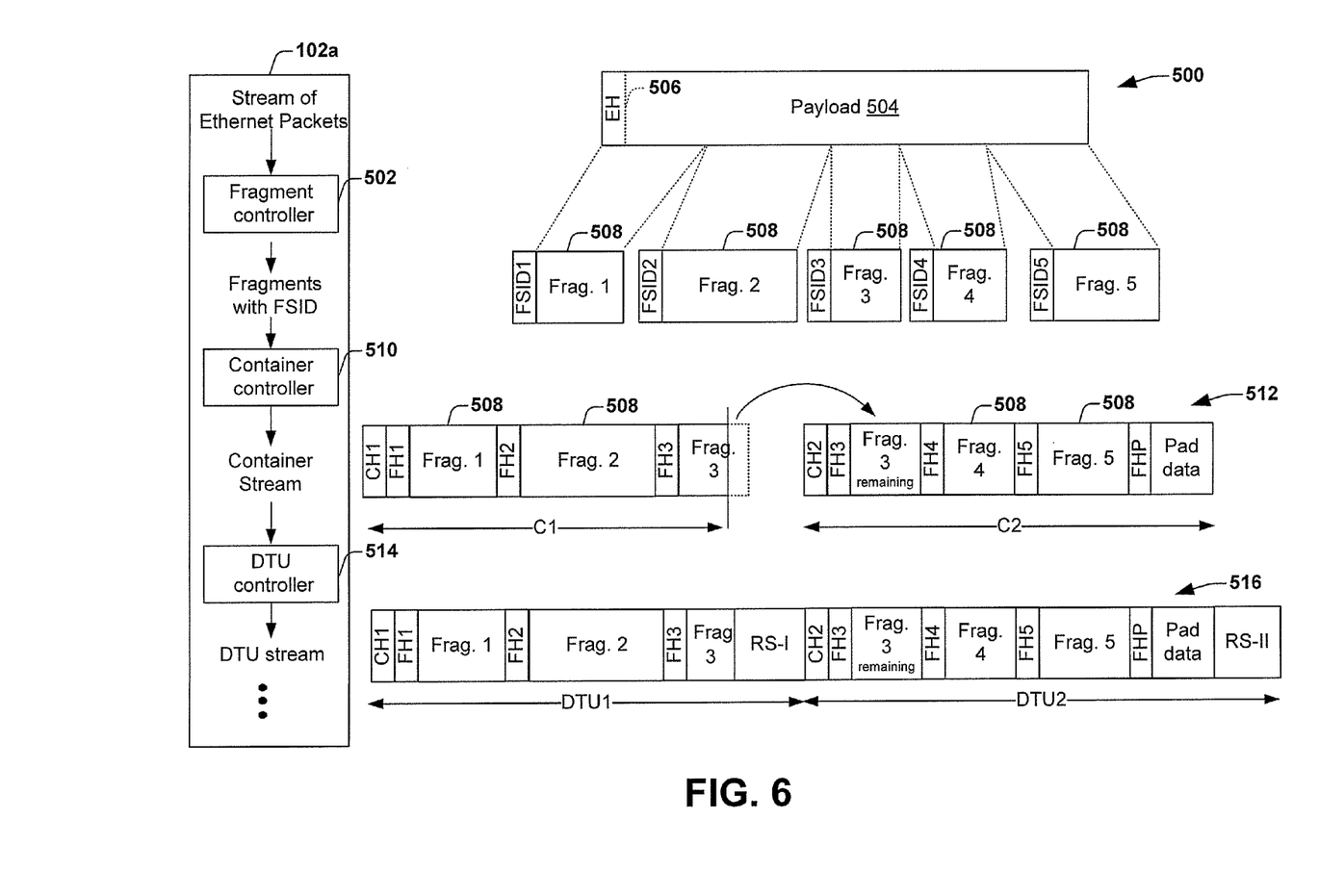
FIG. 6 is a retransmission protocol from the viewpoint of a transmitter according to an embodiment.

Referring now to FIG. 6, one can see still another embodiment of a retransmission scheme which is suitable for different types of TC layer payload. This embodiment is somewhat similar to those previously discussed, however, in this embodiment the payload data unit is an Ethernet packet that is fragmented before to being grouped into a container.

More specifically, a stream of Ethernet packets 500 is received at a fragment controller 502. Each Ethernet packet includes payload data 504 and an Ethernet header (EH) 506, which specifies an Ethernet packet sequence number. The fragment controller 502 then breaks the Ethernet packet into fragments 508 and appends fragment sequence identifier, FSID, to each fragment.

A container controller 510 than packs the fragments 508 into containers 512, whereby some fragments may be "split"

between containers. For example, fragment3 is split between containers C1 and C2). Often, each container may include a container header (CH) and a series of fragment headers (FH) identifying the boundaries of fragments within the container. As discussed in more detail below, the FH may include the FSID as well as other information.

After the containers are packed, the DTU controller 514 appends Reed-Solomon redundancy bytes the end of each container to form a transmission data stream 516. The transmission data stream is then transmitted over the line.

If the receiver receives uncorrectable data, the receiver can provide the FSID corresponding to the uncorrectable data back over the line to the retransmission controller of the transmitter. The retransmission controller can then retransmit the necessary data associated with the FSID. Notably, because DSL systems maintain various counters for performance monitoring, as long as the transmitter and receiver keep count of the DTUs there is no need to transfer any label other than the FSID in this embodiment. Thus, since the transmitter and receiver are synchronized in DSL, there is no need to transmit CIDs from transmitter to receiver in this embodiment. Consequently, by not transmitting CIDs, some amount of overhead is saved.

Figure 7:
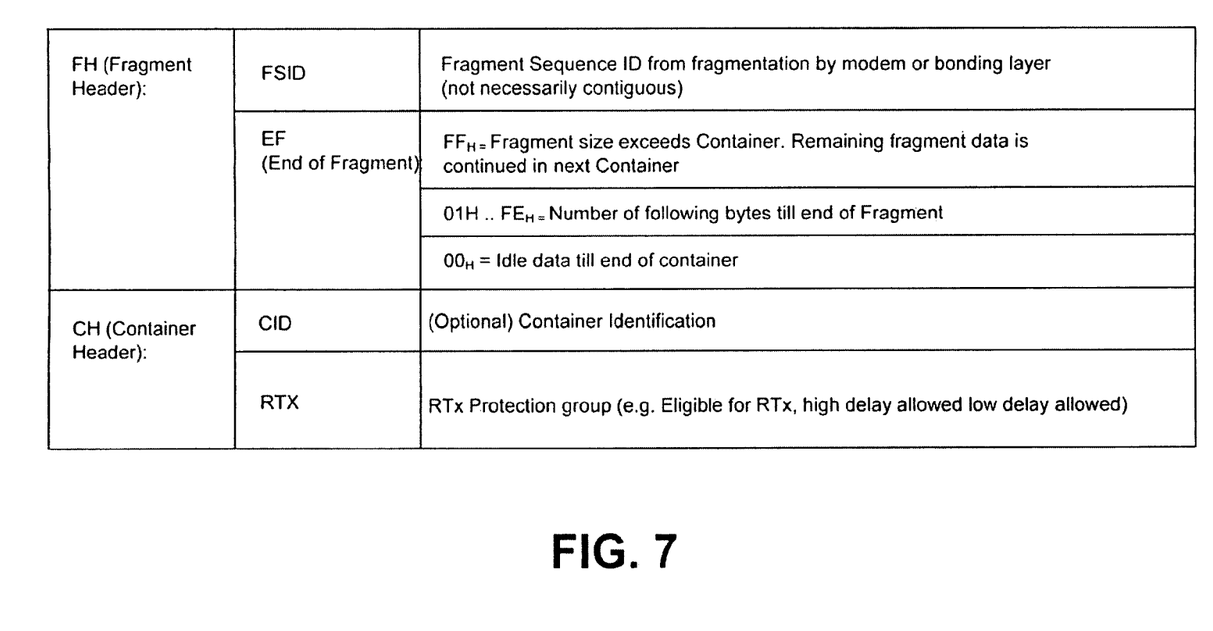
FIG. 7 is chart according to an embodiment of the present invention.

As FIG. 7 shows, the fragment header (FH) may include the FSID field as well as an End of Fragment (EF) field. The illustrated EF field includes an illustrative coding scheme that could be used to identify how the end of the fragment aligns with respect to the end of a container. Other coding schemes could also be used. Additional fields in the fragment header (not shown) can also indicate the alignment of EL data and NEL data within a given fragment or between fragments, or can indicate the alignment of retransmitted data and newly transmitted data within a given fragment or between fragments.

In one embodiment, the containers having EL data have unique container IDs and the containers having NEL have the ID of the previous eligible container. Along with the retransmission eligibility information and the unique sequence ID for data unit, the retransmission system can identify the corrupted data using error detection/correction technique and if the data that is corrupted belongs to the eligible data stream. One advantage with the scheme is that only the eligible stream carries unique IDs and non eligible data carries the ID of the eligible container. So, if a non eligible data container is lost, the receiver will not even request the lost data because there must have been an earlier container received successfully with eligible data.

Figure 8:
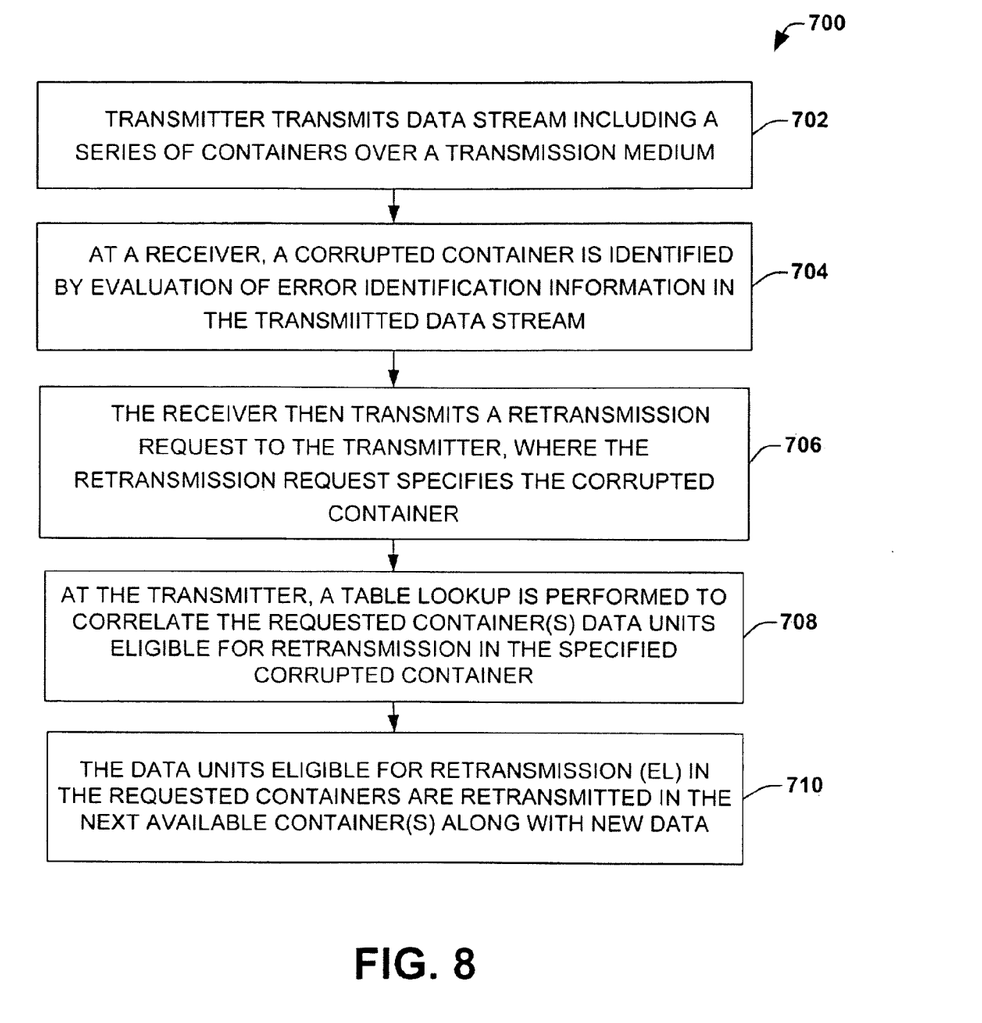
FIG. 8 is a flowchart in accordance with one embodiment.

FIG. 8 shows a method for retransmission 700 and is now briefly discussed. While the method 700 illustrated below is illustrated and described as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated acts or events may be required to implement a methodology in accordance with the present invention.

At 702, a transmitter transmits a transmission data stream that includes a series of containers over a transmission medium.

At 704, a receiver receives the transmission data stream, which may have been altered by noise on the transmission medium. The receiver identifies whether the received data stream includes corrupted container(s) by evaluating error identifying information that is transmitted in the transmission data stream.

At 706, assuming a corrupted container is found, a retransmission request is then transmitted from the receiver to the transmitter. The retransmission request specifies one or more containers that were corrupted by noise during transmission.

At 708 the retransmission request is processed by the transmitter. In this block, a table lookup is performed to correlate the requested container(s) and data units that were originally transmitted in the requested container(s). At 710, the EL data units in the requested containers are retransmitted in the next available container(s).

In some embodiments, "Container repetition" may be used instead of "frame blanking", thereby temporarily stopping or limiting transmission during intervals in which repetitive electrical impulse noise (REIN) occurs.

Thus, the above described embodiments are flexible retransmission schemes that do not limit the size of the data unit. The retransmission schemes use "just enough" overhead when needed, because only the eligible data is encapsulated. It may be argued that the above property can lead to additional overhead whenever there a mix of eligible and non eligible data, but from the application and practical scenarios this is seldom the case, because the eligible data like video are usually contiguous long data packets.

Although the above described embodiments are described with regards to data units that are eligible/non-eligible for retransmission (i.e., two eligibility levels, which may be indicated by a single bit), in other embodiments, additional levels of eligibility levels can be included. For example, three or more levels of eligibility may be used. For example, in some embodiments, "level 1" could be low retransmission eligibility (e.g., retransmit a container only once), "level 2" could be mid-level retransmission eligibility (e.g., retransmit a container only twice), and "level 3" could be high-level retransmission eligibility (e.g., retransmit a container as often as needed to accurately convey the intended message). Several types of criteria can be used to classify data units as eligible for retransmission or non-eligible for retransmission, examples include, but are not limited to: application type, eligible under certain external conditions, (e.g., noise); never eligible; always eligible; and/or eligible for retransmission for a time window. The eligibility criterion for classes of data associated with the retransmission can be changed dynamically based on external criterions like noise characteristics. For example, if the system detects impulse noise on the line, the retransmission eligibility could be set to "level 1", while if the system detects Gaussian white noise on the line, the retransmission eligibility could be set to "level 3." Although an example with 3 levels has just been discussed, it will be appreciated that such eligibility transmission levels could extend to practically infinity, depending on bandwidth and performance requirements.

Although the invention has been illustrated and described with respect to one or more implementations, alterations and/or modifications may be made to the illustrated examples without departing from the spirit and scope of the appended claims. For example, although the invention has been described with respect to ADSL and VDSL communication systems that communicate over a pair of twisted copper wires, the invention is applicable to any communication system and any type of transmission medium. For example, other communication systems could include cell phones, pagers, mobile communication devices, industrial control systems, wide area networks, local area networks, among others. These and other systems could communicate over various types of communication medium, including but not limited to: wireless mediums, optical fiber, coaxial cable, powerline, and many others.

In addition, although various illustrated embodiments are illustrated as a hardware structure, the functionality and corresponding features of the present device can also be performed by appropriate software routines or a combination of hardware and software. In regards to software implementations, the term "computer readable medium" as used herein refers to any medium that participates in providing instructions to the device or to a controller (e.g., microprocessor) associated with the device. Such a medium may take numerous forms, including but not limited to, non-volatile media, volatile media, and transmission media. Non-volatile media includes, for example, optical or magnetic disks. Volatile media includes dynamic memory, such as SRAM or DRAM. Transmission media includes coaxial cables, copper wire, fiber optics, and busses internal or external to the device. Transmission media can also include electromagnetic waves, such as a voltage wave, light wave, or radio wave.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method of communicating data between a transmitter and a receiver of a communication system, comprising:
    receiving a payload data stream comprising data units eligible for retransmission (EL) and data units non-eligible for retransmission (NEL);
    grouping the data units into a container stream comprising a series of containers, where an original container is associated with a container identifier that distinguishes the original container from other containers and where the original container includes one or more data units eligible for retransmission and one or more data units non-eligible for retransmission;
    incorporating the container stream into a transmission data stream transmitted to a receiver;
    receiving a retransmission request from the receiver, the retransmission request specifying the original container in the transmission data stream which was received having corrupted data or which was not received at the receiver; and
    generating a retransmission container in response to the retransmission request, the retransmission container having a payload section including both the data units eligible for retransmission in the original container as well as at least one new data unit not previously transmitted in the original container.

2. The method of claim 1, where data units non-eligible for retransmission in the original container are not included in the retransmission container.

3. The method of claim 2, where the retransmission container and the original container are equal in length, and where a position of new data in the retransmission container corresponds to a position of the data units non-eligible for retransmission in the original container.

4. The method of claim 1, further comprising:
    fragmenting a data unit into at least two fragments prior to grouping the data units into the container stream.

5. The method of claim 4, where a single fragment is split between at least two containers and where the single fragment is associated with a header specifying how a boundary of the single fragment aligns with respect to the at least two containers.

6. The method of claim 1, where the payload data stream is received at a network interface layer that is a data link layer or a physical layer of a network stack.

7. The method of claim 1, where each data unit includes only a single complete Ethernet packet, only a single complete Asynchronous Transfer Mode (ATM) cell, or a single complete Ethernet fragment.

8. The method of claim 1, where containers are grouped so that each container has an approximately constant number of data units.

9. The method of claim 8, where the approximately constant number of data units for each container can be changed dynamically using a reconfiguration protocol.

10. The method of claim 1, where containers are grouped so that data units eligible for retransmission are packed into a container having a container length up to some maximum number of data units, and where data units non-eligible for retransmission are packed into separate containers from the data units eligible for retransmission.

11. A transmitter, comprising:
    a network interface layer adapted to receive a payload data stream;
    a container controller adapted to group data units of the payload data stream into containers, where an original container includes one or more data units eligible for retransmission and one or more data units non-eligible for retransmission;
    a data transmission controller adapted to group the containers into data transmission units, where a data transmission unit includes the original container;
    a transmission controller that mixes un-transmitted data transmission units with data transmission units to be retransmitted, thereby generating a transmission data stream suitable for transmission over a transmission medium; and
    a retransmission controller adapted to analyze a retransmission request and determine which eligible data units stored in the retransmission buffer are to be re-transmitted over the transmission medium, and further configured to pack both a data unit eligible for retransmission from the original container and a new data unit not previously transmitted into a payload section of a retransmission container for transmission over the transmission medium.

12. The transmitter of claim 11, where a data transmission unit includes redundancy information that facilitates error detection for the data transmission unit.

13. The transmitter of claim 11, where the container controller is adapted to append a container header to each container, the container header comprising:
    a retransmission eligibility field; and
    a container identifier that distinguishes the containers from one another.

14. The transmitter of claim 11, further comprising:
a fragment controller adapted to fragment a data unit into at least two fragments, where a fragment is associated with a fragment header that is different from that of other fragments.

15. The transmitter of claim 14, where the fragment header comprises:
a fragment sequence identifier; and
an end_of_fragment (EF) field that indicates how a fragment boundary associated with the fragment relates to a container boundary of a container in which the fragment at least partially resides.

16. The transmitter of claim 11, further comprising:
a retransmission buffer adapted to store eligible data units from the transmission data stream after the eligible data units are transmitted.

17. The transmitter of claim 11, where the retransmission controller uses a table-lookup to correlate a container identification number obtained from the retransmission request with the eligible data units stored in the retransmission buffer.

18. The transmitter of claim 16, where the retransmission buffer is adapted to store embedded overhead channel data associated with eligible data units of a container.

19. A communication system, comprising:
a transmitter adapted to transmit data transmission units over a transmission medium, the data transmission units including one or more containers associated with respective container identifiers, and the containers including data units eligible for retransmission and data units non-eligible for retransmission;
a receiver adapted to receive the data transmission units and transmit a retransmission request that specifies uncorrectable data received in at least one of the containers;
where the transmitter further comprises:
a retransmission controller adapted to generate a retransmission container in response to the retransmission request, where the retransmission container includes at least one previously transmitted data unit eligible for retransmission from a container along with new data instead of at least one previously transmitted data unit non-eligible for retransmission from the container.

20. The communication system of claim 19, where the retransmission request includes a container identifier that corresponds to a container associated with the uncorrectable data.

21. The communication system of claim 20, where the retransmission request includes upstream payload data piggybacked onto the container identifier.

22. The communication system of claim 20, where the transmitter and receiver synchronously update a count value representative of the container identifier.

23. A method, comprising:
packing a data unit eligible for retransmission and a data unit non-eligible for retransmission into a payload section of an original container;
providing a header section for the original container and transmitting the original container and header section to a receiver;
after the original container has been transmitted, receiving a request for retransmission of the original container from the receiver;
packing the data unit eligible for retransmission and a new data unit into a payload section of a retransmission container; and
providing a retransmission header section for the retransmission container and transmitting the retransmission container and retransmission header section to the receiver in response to the request for retransmission.

* * * * *